(12) United States Patent
Fujiwara

(10) Patent No.: US 7,663,427 B2
(45) Date of Patent: Feb. 16, 2010

(54) BOOSTER CIRCUIT

(75) Inventor: Hirofumi Fujiwara, Shiga (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 24 days.

(21) Appl. No.: 12/000,612

(22) Filed: Dec. 14, 2007

(65) Prior Publication Data
US 2008/0157857 A1 Jul. 3, 2008

(30) Foreign Application Priority Data
Dec. 27, 2006 (JP) ............... 2006-351652

(51) Int. Cl.
G05F 1/10 (2006.01)
G05F 3/02 (2006.01)
(52) U.S. Cl. ............... 327/536; 327/537; 363/59; 363/60
(58) Field of Classification Search ........... 327/536, 327/537; 363/59, 60
See application file for complete search history.

(56) References Cited

U.S. PATENT DOCUMENTS

| | | | | |
|---|---|---|---|---|
| 4,807,104 A * | 2/1989 | Floyd et al. | .................... | 363/59 |
| 5,387,228 A * | 2/1995 | Shelton | ........................ | 607/11 |
| 5,461,557 A * | 10/1995 | Tamagawa | .................... | 363/60 |
| 5,532,916 A * | 7/1996 | Tamagawa | .................... | 363/62 |
| 5,581,454 A * | 12/1996 | Collins | ........................ | 363/59 |
| 5,734,291 A * | 3/1998 | Tasdighi et al. | .............. | 327/537 |
| 6,107,862 A * | 8/2000 | Mukainakano et al. | ...... | 327/536 |
| 6,400,211 B1 * | 6/2002 | Yokomizo et al. | ............ | 327/536 |
| 6,504,422 B1 * | 1/2003 | Rader et al. | .................. | 327/536 |
| 6,522,558 B2 * | 2/2003 | Henry | ......................... | 363/60 |
| 6,556,067 B2 * | 4/2003 | Henry | ........................ | 327/536 |
| 6,563,235 B1 * | 5/2003 | McIntyre et al. | ............ | 307/109 |
| 6,657,875 B1 * | 12/2003 | Zeng et al. | .................... | 363/59 |
| 6,717,458 B1 * | 4/2004 | Potanin | ........................ | 327/536 |
| 6,794,926 B2 * | 9/2004 | Rader et al. | .................. | 327/536 |
| 6,853,566 B2 * | 2/2005 | Itoh | ............................ | 363/60 |
| 6,920,055 B1 * | 7/2005 | Zeng et al. | .................... | 363/59 |
| 6,927,441 B2 * | 8/2005 | Pappalardo et al. | ......... | 257/299 |
| 6,960,955 B2 * | 11/2005 | Nonaka | ....................... | 327/536 |
| 6,995,995 B2 * | 2/2006 | Zeng et al. | .................... | 363/60 |
| 7,050,315 B2 * | 5/2006 | Itoh | ............................ | 363/60 |
| 7,142,040 B2 * | 11/2006 | Naka et al. | ................... | 327/536 |
| 7,180,760 B2 * | 2/2007 | Varrichio et al. | .............. | 363/59 |
| 7,233,508 B2 * | 6/2007 | Itoh | ............................ | 363/60 |
| 7,250,810 B1 * | 7/2007 | Tsen et al. | .................... | 327/536 |
| 7,427,889 B2 * | 9/2008 | Lin et al. | .................... | 327/536 |

(Continued)

FOREIGN PATENT DOCUMENTS

JP 08-149802 6/1996

*Primary Examiner*—Lincoln Donovan
*Assistant Examiner*—Adam D Houston
(74) *Attorney, Agent, or Firm*—McGinn IP Law Group, PLLC

(57) ABSTRACT

A charge pump type booster circuit generates a positive or negative boosted output voltage by switching booster paths one by one. This charge pump type booster circuit includes a plurality of booster paths, each of the plurality of booster paths including at least one booster capacitor, wherein a number of the booster capacitor at each of the plurality of booster paths is different between one booster path and the other booster path. This makes it possible to suppress an increase in a number of an external capacitor for setting an output voltage of the booster circuit constant.

20 Claims, 9 Drawing Sheets

U.S. PATENT DOCUMENTS

| | | | |
|---|---|---|---|
| 7,468,898 B2* | 12/2008 | Ogata et al. | 363/59 |
| 7,502,239 B2* | 3/2009 | Itoh | 363/60 |
| 7,504,877 B1* | 3/2009 | Voogel et al. | 327/536 |
| 7,518,432 B2* | 4/2009 | Lin et al. | 327/536 |
| 2003/0169097 A1* | 9/2003 | Henry | 327/536 |
| 2005/0169021 A1* | 8/2005 | Itoh | 363/60 |
| 2006/0176718 A1* | 8/2006 | Itoh | 363/60 |
| 2007/0052471 A1* | 3/2007 | Ng | 327/536 |
| 2007/0146050 A1* | 6/2007 | Chen et al. | 327/536 |
| 2007/0146051 A1* | 6/2007 | Tsen | 327/536 |
| 2007/0152737 A1* | 7/2007 | Lin et al. | 327/536 |
| 2007/0297203 A1* | 12/2007 | Itoh | 363/60 |
| 2008/0084720 A1* | 4/2008 | Thiele et al. | 363/60 |
| 2008/0150619 A1* | 6/2008 | Lesso et al. | 327/536 |
| 2008/0150620 A1* | 6/2008 | Lesso | 327/536 |
| 2009/0051414 A1* | 2/2009 | Pahr | 327/536 |
| 2009/0072891 A1* | 3/2009 | Perisetty | 327/536 |

* cited by examiner

BOOSTER CIRCUIT

BACKGROUND OF THE INVENTION

1. Field of the Invention

The present invention relates to a booster circuit. More particularly, this invention relates to a charge pump type booster circuit.

2. Description of Related Art

Generally, a booster circuit is required to keep an output voltage constant. However, in a charge pump type booster circuit, the output voltage drops in a relatively short period of time when a value of a current flowing to a load becomes larger. Note that the load is connected to the booster circuit in general.

A related technique disclosed in a Japanese Unexamined Patent Application Publication No. 8-149802 is shown in FIG. 9. As shown in FIG. 9, a booster circuit 100 has two booster units 110, 120. Control signals A and B are input to the booster unit 110. The control signals A and B are input to the booster unit 120 after inverted by buffers, which are connected to input terminals of the booster unit 120. A capacitor C100 is charged by the booster unit 120 when the control signal A is high (H) and the control signal B is low (L). The capacitor C100 is charged by the booster unit 110 when the control signal A is low (L) and the control signal B is high (H). That is, the capacitor C100 is charged by the booster unit 110 and the booster unit 120 alternately along with the time axis.

It is common in the charge pump type booster circuit to use external capacitor parts, which are provided separately from an IC (Integrated Circuit) chip including the charge pump type booster circuit. Because the charge pump type booster circuit requires a large capacitance value, it is often not enough for an integrated capacitor to satisfy the required capacitance value.

In this case, an increase in a number of the capacitors results in an increase of manufacturing cost of the circuit. When a plurality of booster units as shown in FIG. 9 are used so as to suppress ripples of the output voltage, manufacturing cost of the circuit raises accordingly and it becomes difficult to suppress the cost up of the circuit.

As explained above, it was difficult to suppress a total number of external capacitors so as to keep the output voltage constant.

SUMMARY

In one embodiment, a charge pump type booster circuit generates a positive or negative boosted output voltage by switching booster paths one by one. This charge pump type booster circuit includes a plurality of booster paths, each of the plurality of booster paths including at least one booster capacitor, in which a number of the booster capacitor at each of the plurality of booster paths is different between one booster path and the other booster path.

This makes it possible to suppress an increase in a number of an external capacitor for setting an output voltage of the booster circuit constant.

In still another embodiment, a booster circuit includes a first output path boosting an input voltage N (N is a positive or negative integer having an absolute value two or more) times; and a second output path boosting the input voltage N times; in which the booster circuit outputs a first boosted voltage output from the first output path and a second boosted voltage output from the second output path alternately based on a control signal transmitted from a control circuit, and in which the second boosted voltage is set based on a boosted voltage gained by boosting the input voltage M (M is a positive or negative integer having an absolute value smaller than that of N) times when the first output voltage is output from the booster circuit.

The output voltage is set based on the boosted voltage. This boosted voltage is gained by boosting the input voltage M times. This makes it possible to suppress an increase in a number of an external capacitor for setting an output voltage of the booster circuit constant.

In still another embodiment, a charge pump type booster circuit generates a positive or negative boosted output voltage. The charge pump type booster circuit includes a first booster path connected between an input terminal and an output terminal to output the positive or negative boosted output voltage gained by boosting an input voltage through N (N is a positive integer of two or more) capacitors; and a second booster path connected between the input terminal and the output terminal to output the positive or negative boosted output voltage gained by boosting the input voltage through M (M is a positive integer of less than N) capacitor. This makes it possible to suppress an increase in a number of an external capacitor for setting an output voltage of the booster circuit constant.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
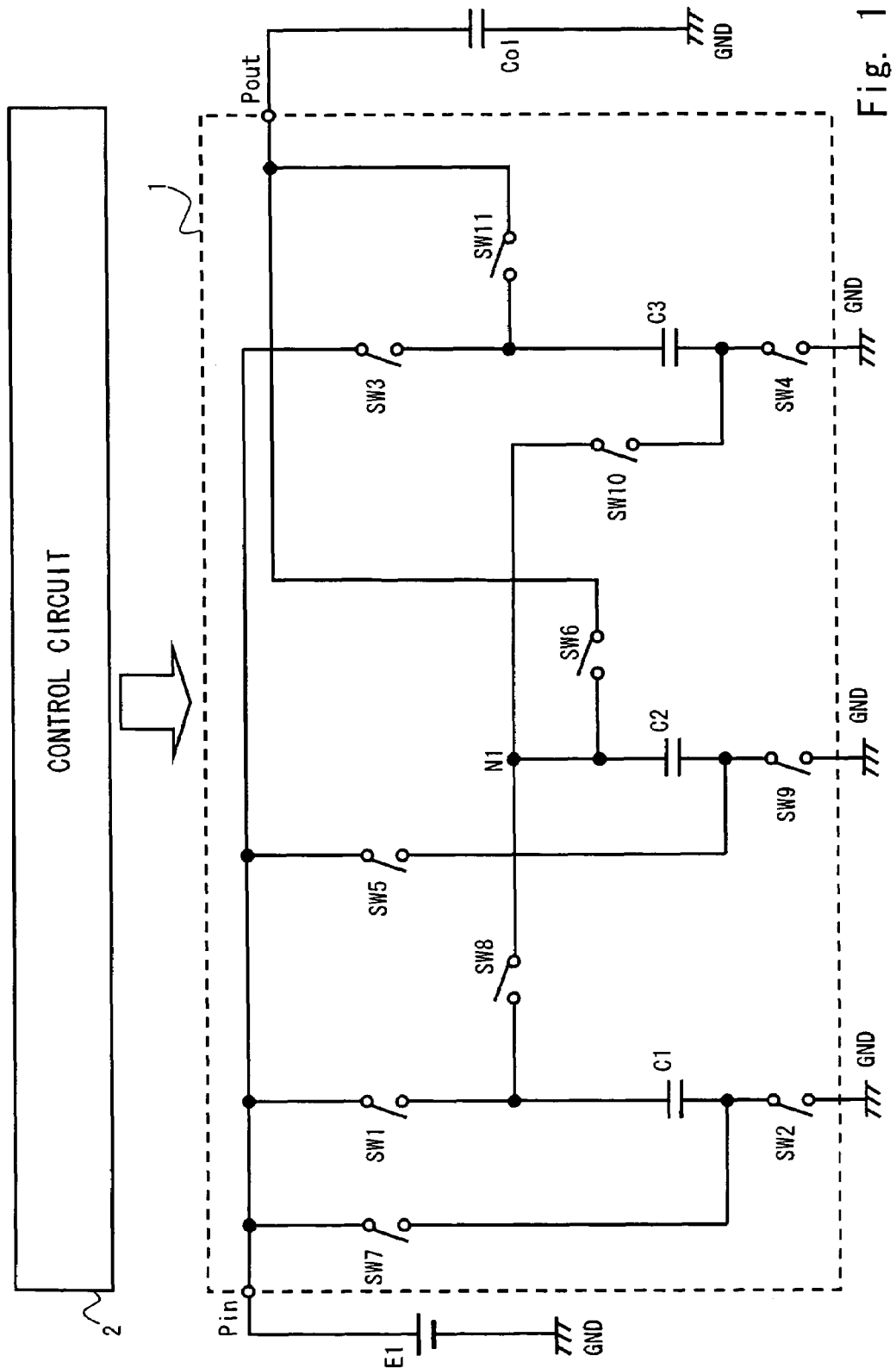
FIG. 1 is a schematic circuit diagram of a booster circuit according to a first embodiment of the present invention.

FIG. 1 shows a schematic circuit diagram of a booster circuit 1 according to the first embodiment of the present invention. A control circuit 2 is also shown in FIG. 1 which controls switches SW1-SW11 ON or OFF. The switches SW1-SW11 are included in the booster circuit 1.

First, connection relations of circuit elements included in the booster circuit 1 is explained.

As shown in FIG. 1, the booster circuit 1 includes an input terminal Pin, an output terminal Pout, switches SW1-SW11, and capacitors C1-C3.

The input terminal Pin is connected to a power supply E1. The output terminal Pout is connected to a smoothing capacitor Col. An input voltage is supplied from the power supply E1 to the booster circuit 1 via the input terminal Pin. The smoothing capacitor Col is charged by an output voltage output from the booster circuit 1 via the output terminal Pout. The output voltage is a voltage gained by boosting the input voltage by the booster circuit 1.

A first end of the capacitor C1 is connected to the power supply E1 via the switch SW1 and the input terminal Pin. The first end of the capacitor C1 may be set to a power supply potential VDD (a first power supply potential). Note that the first end of the capacitor C1 is connected to a second end of the capacitor C3 via the switch SW8 (a second switch unit) and the switch SW10 (a sixth switch unit).

A second end of the capacitor C1 is connected to ground via the switch SW2. And the second end of the capacitor C1 may be set to a ground potential GND (a second power supply potential). Note that the second end of the capacitor C1 is connected to the power supply E1 via the switch SW7 (a first switch unit) and the input terminal Pin. The second end of the capacitor C1 may be set to a power supply potential VDD.

A first end of the capacitor C3 is connected to the power supply E1 via the switch SW3 and the input terminal Pin. The first end of the capacitor C3 may be set to a power supply potential VDD. The first end of the capacitor C3 is also connected to an end of the smoothing capacitor Col via the switch SW11 and the output terminal Pout. A second end of the capacitor C3 is connected to the first end of the capacitor C1 via the switches SW10 and SW8.

A first end of the capacitor C2 (a second boosting capacitor) is connected to the first end of the capacitor C1 via the switch SW8. The first end of the capacitor C2 is connected to the end of the smoothing capacitor Col via the switch SW6 (a fifth switch unit) and the output terminal Pout. Note that the first end of the capacitor C2 is connected to a node N1 between the switch SW8 and the switch SW10.

A second end of the capacitor C2 is connected to ground via the switch SW9 (switch unit). The second end of the capacitor C2 may be set to a ground potential GND. The second end of the capacitor C2 is connected to the power supply E1 via the switch SW5 (a forth switch unit) and the input terminal Pin. The second end of the capacitor C2 may be set to a power supply potential VDD.

The switches SW1-SW11 included in the booster circuit 1 becomes ON (conductive) or OFF (non-conductive) based on control signals from the control circuit 2.

Figure 2:
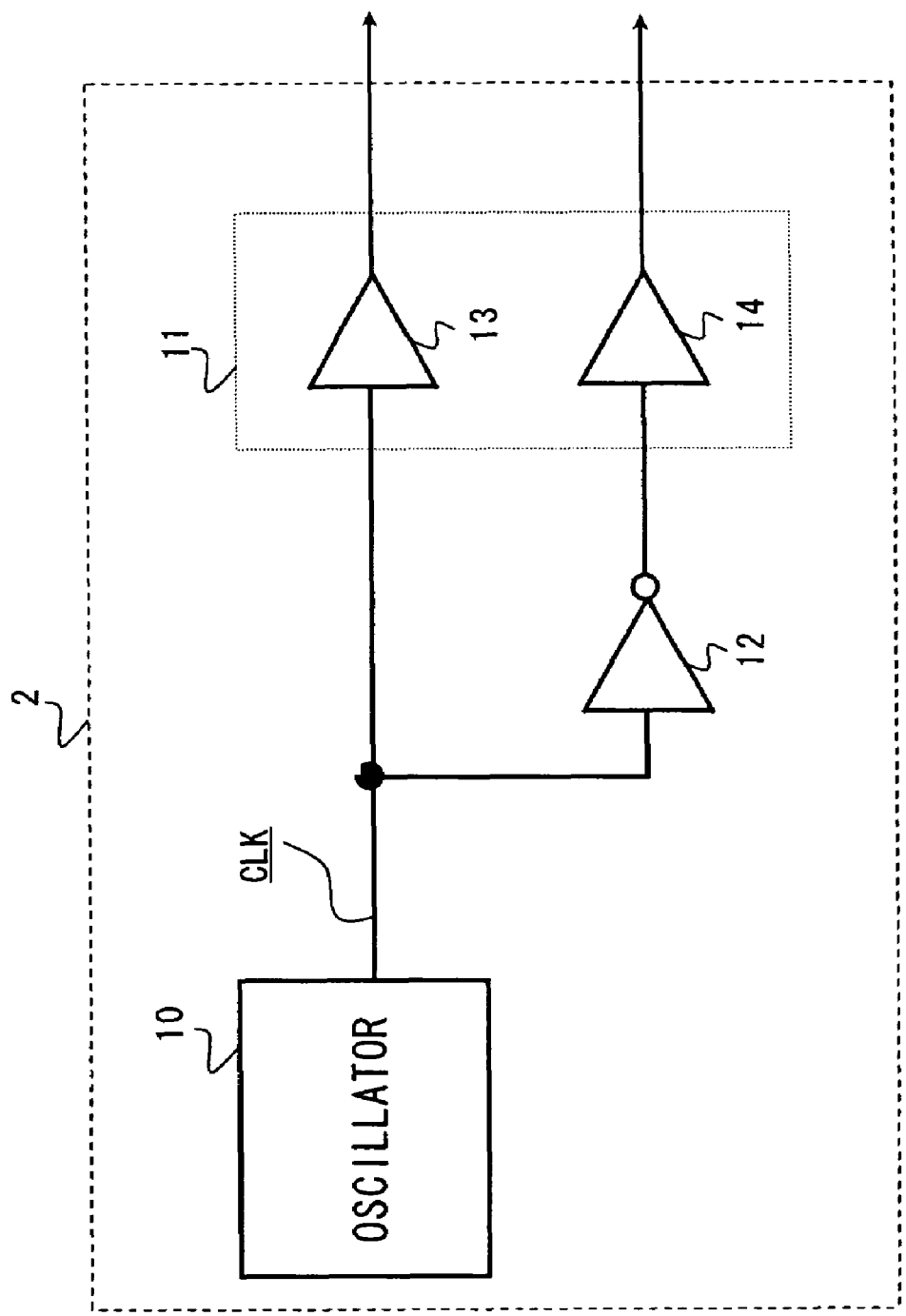
FIG. 2 is a schematic view for explaining a configuration of a control circuit.

Now, a configuration of the control circuit 2 is shown in FIG. 2. As shown in FIG. 2, the control circuit 2 includes an oscillator 10, a level shift unit 11, and an inverting buffer 12. The level shift unit 11 includes a first buffer 13 and a second buffer 14.

The oscillator 10 outputs a clock signal (CLK) having a predetermined cycle. This clock signal is input to the first buffer 13 included in the level shift unit 11. This clock signal is also input to the second buffer 14 after inverted by the inverting buffer 12.

With such a configuration, the control circuit 2 outputs a first control signal output from the first buffer 13 and a second control signal output from the second buffer 14. When the first control signal is HIGH, the second control signal is LOW. When the first control signal is LOW, the second control signal is HIGH. The first control signal is input to the switches SW1-SW6. The second control signal is input to the switches SW7-SW11.

Figure 3:
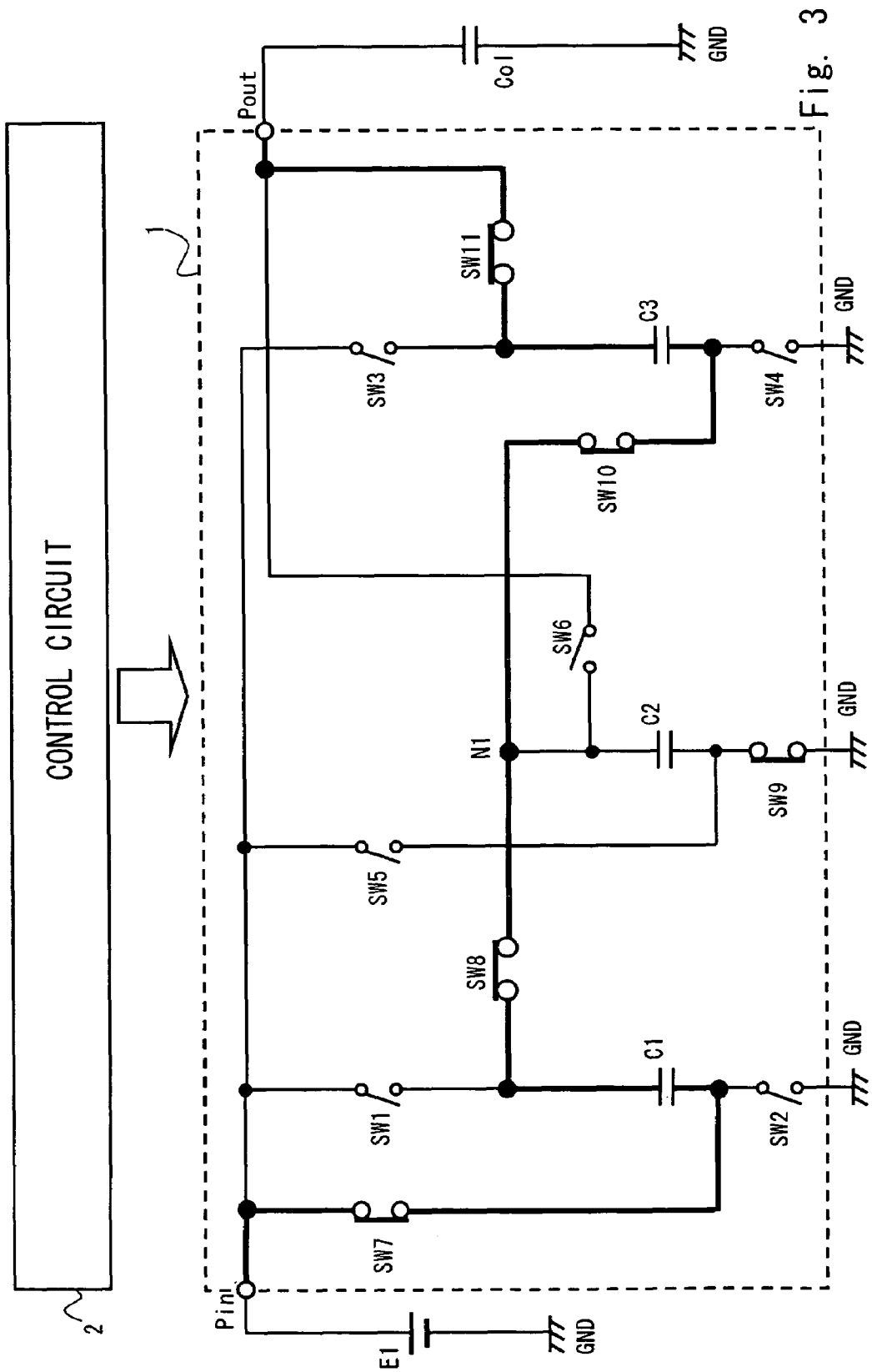
FIG. 3 is a schematic circuit diagram of the booster circuit in a first condition.

With a reference to FIG. 3, the booster circuit 1 in a first condition is explained. The booster circuit 1 is to be in the first condition based on the first and second control signals transmitted from the control circuit 2. Note that all the switches SW1-SW6 are in an OFF-state and all the switches SW7-SW11 are in an ON-state when the booster circuit 1 is in the first condition.

As shown in FIG. 3, a first switch group including switches SW7-SW11 is in an ON-state when the booster circuit 1 is in the first condition. Note that the first switch group includes all the switches SW7-SW11 included in a latter mentioned first booster path.

When the first switch group is in an ON-state, the first booster path is generated between the input terminal Pin and the output terminal Pout. This first booster path includes the first switch group on its path. The first booster path boosts the input voltage (VDD) input from the power supply E1 via the input terminal Pin three times, and outputs the tripled voltage (3VDD) as an output voltage (a first output voltage).

This output voltage is input to the smoothing capacitor Col via the output terminal Pout. Note that the second end of the capacitor C1 included in the first booster path is connected to the input terminal Pin. The first end of the capacitor C1 is connected to the capacitor C3. The second end of the capacitor C3 included in the first booster path is connected to the first end of the capacitor C1. The first end of the capacitor C3 is connected to the smoothing capacitor Col via the output terminal Pout. The capacitor C1 and the capacitor C3 are connected in series between the input terminal Pin and the output terminal Pout.

In this embodiment, when the booster circuit 1 is in the first condition, the first end of the second capacitor C2 is connected to the first end of the capacitor C1 and the second end of the capacitor C2 is connected to the ground. Note that the switch SW8 and the switch SW9 are both in an ON-state.

The capacitor C2 is charged based on the boosted voltage (2VDD), which is generated by the capacitor C1, when the booster circuit 1 is in the first condition. In other words, the capacitor C2 is charged by the boosted voltage (2VDD) that is generated by the capacitor C1.

The boosted voltage is a voltage gained by boosting the input voltage (VDD) two times and is smaller than the output voltage that is boosted by boosting the input voltage (VDD) three times. The multiple for the boosted voltage is smaller than the multiple for the output voltage.

Note that the capacitor C2 is in a state of being charged. This makes it possible to set the output voltage 3VDD when the booster circuit 1 changes from the first condition to a second condition.

When the booster circuit 1 is in the first condition, the switches SW1 (switch unit) and SW2 (switch unit) for charging, the capacitor C1 are both in an OFF-state. And the switches SW3 and SW4 for charging the capacitor C3 are both in an OFF-state. And both of the switches SW6 between the first end of the capacitor C2 and the output terminal Pout and SW5 between the second end of the capacitor C2 and the input terminal Pin are in an OFF-state.

Figure 4:
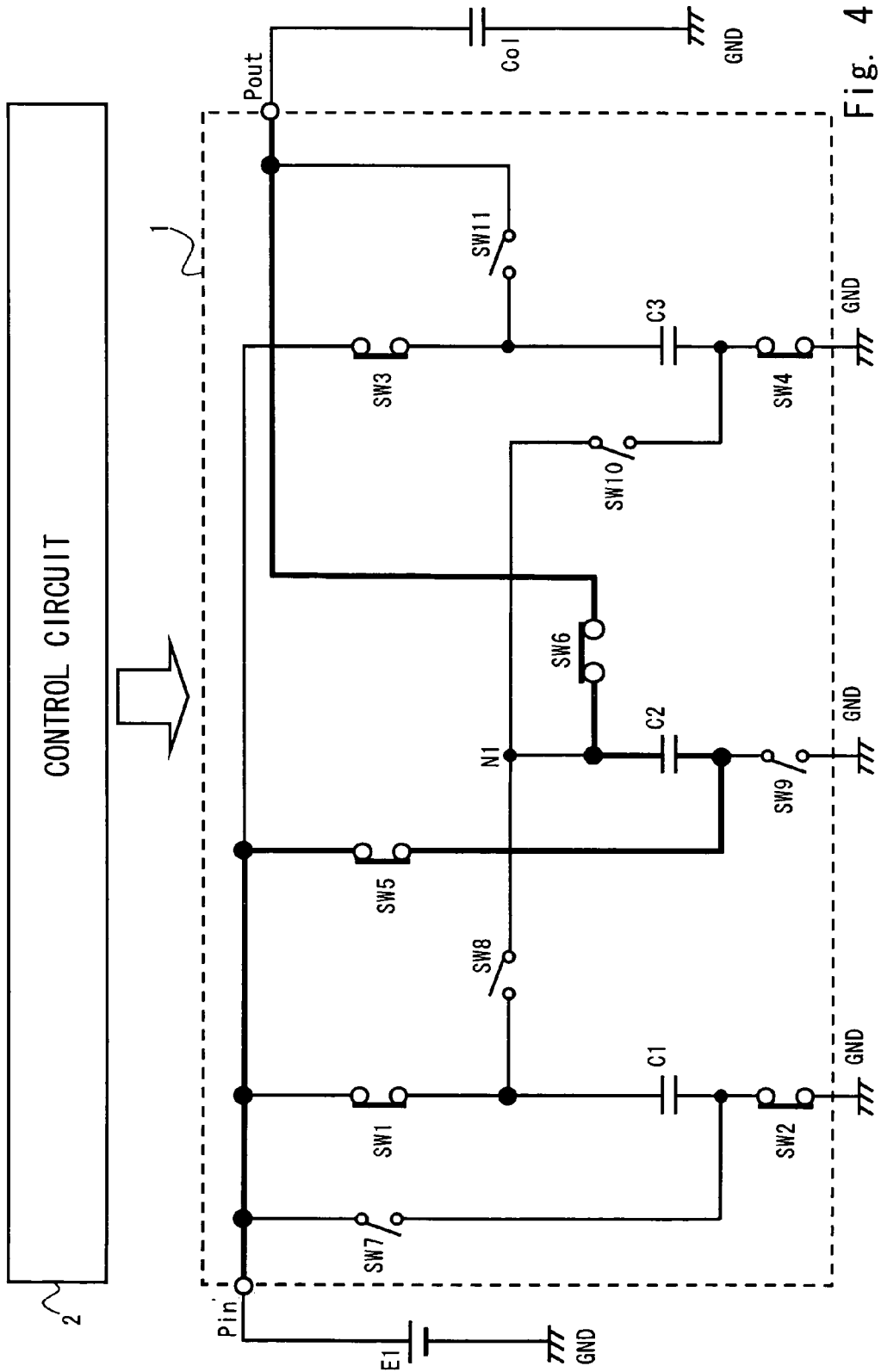
FIG. 4 is a schematic circuit diagram of the booster circuit in a second condition.

Next, with a reference to FIG. 4, the booster circuit 1 in the second condition is explained. The booster circuit 1 is to be in the second condition based on the first and second control signals output from the control circuit 2. Note that all the switches SW1-SW6 are in an ON-state and all the switches SW7-SW11 are in an OFF-state when the booster circuit 1 is in the second condition.

The booster circuit 1 changes to the first condition or the second condition alternately at a predetermined time interval so as to set the output voltage within a predetermined voltage range.

As shown in FIG. 4, a second switch group including switches SW5 and SW6 is in an ON-state when the booster circuit 1 is in the second condition. Note that the second switch group includes the switches SW5 and SW6 included in the second booster path.

When the second switch group is in an ON-state, the second booster path is generated between the input terminal Pin and the output terminal Pout. This second booster path includes the second switch group on its path. The second booster path boosts the input voltage (VDD) input from the power supply E1 via the input terminal Pin three times, and outputs the tripled voltage (3VDD) as the output voltage (a second output voltage).

This output voltage is input to the smoothing capacitor Co1 via the output terminal Pout. Note that the first end of the capacitor C2 included in the second booster path is connected to the output terminal Pout and the second end of the capacitor C2 is connected to the input terminal Pin.

In this embodiment, when the booster circuit 1 is in the first condition, the first end of the second capacitor C2 is set at a potential level 2VDD (a level of the boosted voltage). Therefore, it is possible to set the first end of the capacitor C2 at a potential level 3VDD by changing the condition of the booster circuit 1 from the first condition to the second condition. In other words, it is possible to set the first end of the capacitor C2 at a potential level 3VDD by connecting the second end of the capacitor C2 with the power supply E1 via the switch SW5 and the input terminal Pin, and setting the second terminal of the capacitor C2 at a potential level VDD.

In this way, the input voltage VDD is boosted by three times. And the second booster path outputs the tripled voltage 3VDD as the output voltage. Note that the input voltage input to the second terminal of the capacitor C2 is a voltage to be boosted.

When the booster circuit 1 is in the second condition, both of the switches SW1 and SW2 are in an ON-state and the capacitor C1 is in a state of being charged. Both of the switches SW3 and SW4 are in an ON-state and the capacitor C3 is in a state of being charged. The capacitors C1 and C3 are connected to the input terminal Pin in parallel and charged by the input voltage VDD supplied from the power supply E1.

Using now a timing chart of FIG. 5, an operation of the booster circuit 1 is further explained with reference to FIGS. 6 and 7.

Figure 5:
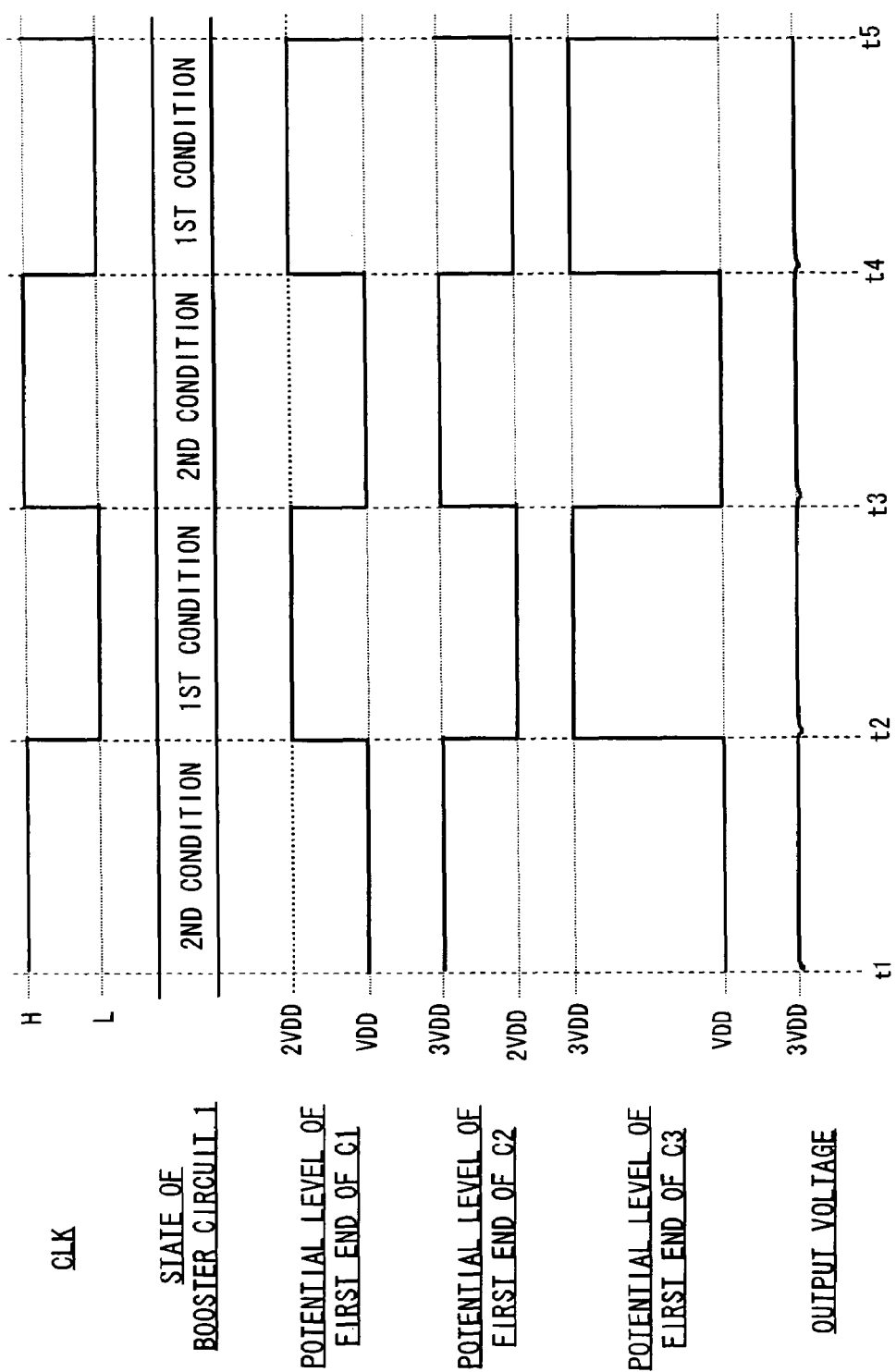
FIG. 5 is a timing chart for explaining a function of the booster circuit.

As shown in FIG. 5, during a period t1 to t2, the clock signal CLK output from the oscillator 10 is HIGH and the booster circuit 1 is in the second condition. At this time, the capacitor C1 is in a state of being charged. Therefore, the first end of the capacitor C1 is set to a power supply potential VDD. The first end of the capacitor C3 is also set to a power supply potential VDD.

As shown in FIG. 5, during a period t2 to t3, the clock signal CLK output from the oscillator 10 is LOW, and the booster circuit 1 is in the first condition. At this time, as shown in FIG. 6, the power supply E1, the input terminal Pin, the capacitor C1, the capacitor C3, and the output terminal Pout are connected in series in this order.

When the booster circuit 1 changes from the second condition to the first condition, the second end of the capacitor C1 is set to a potential level VDD. More specifically, a potential level of the second end of the capacitor C1 rises from a potential level GND to a potential level VDD. And a potential level of the first end of the capacitor C1 rises from a potential level VDD to a potential level 2VDD.

A potential level of the second end of the capacitor C3 rises from a potential level GND to a potential level 2VDD in accordance with a rise in potential level of the first end of the capacitor C1. And the output voltage output from the booster circuit 1 is set to 3VDD that is three times higher than the input voltage VDD.

Figure 6:
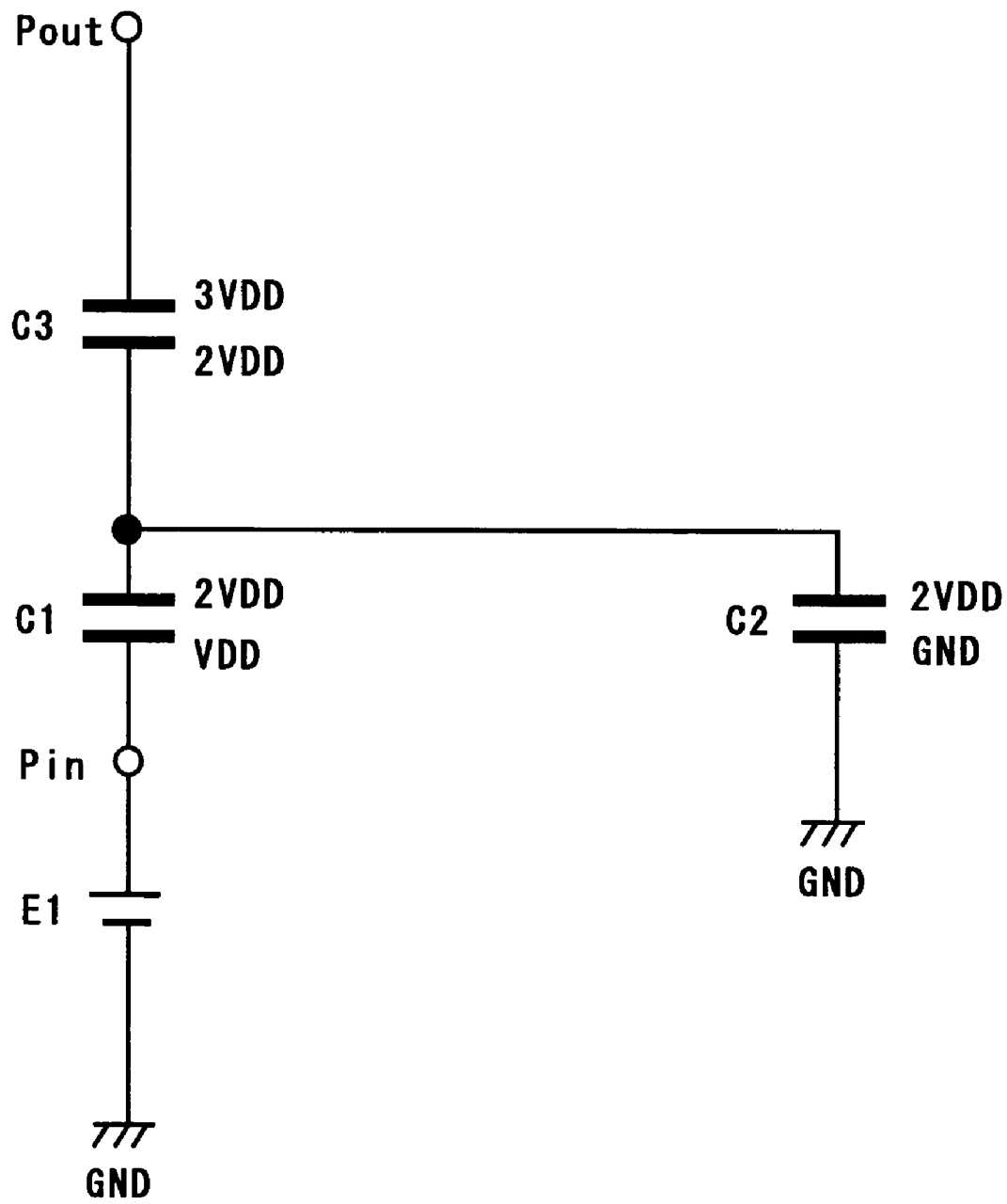
FIG. 6 is a reference view for explaining a configuration of the booster circuit in the first condition.
Figure 7:
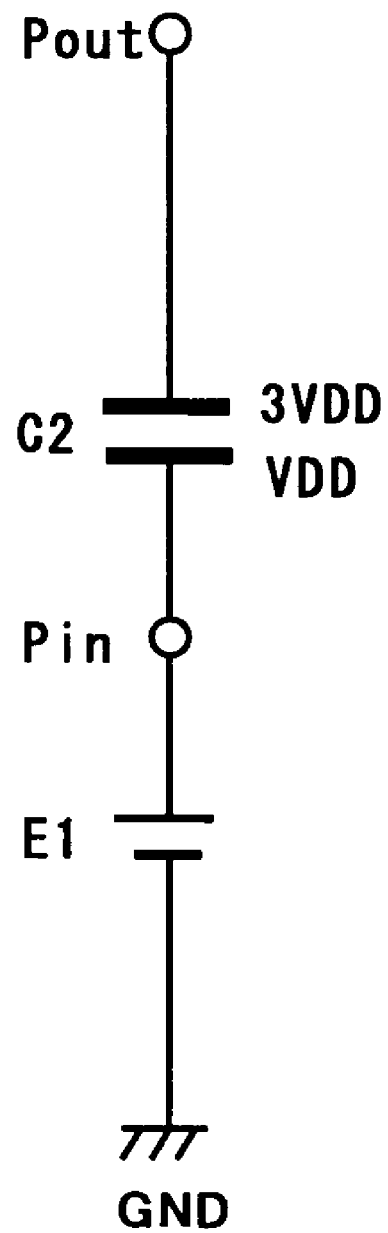
FIG. 7 is a reference view for explaining a configuration of the booster circuit in the second condition.

As shown in FIG. 6, a potential level of the first end of the capacitor C1 and a potential level of the first end of the capacitor C2 are set to be the same when the booster circuit 1 is in the first condition. Therefore, a potential level of the first end of the capacitor C2 is set to a potential level 2VDD at the same time when a potential level of the first end of the capacitor C1 is set to a potential level 2VDD. A potential level of the first end of the capacitor C2 is set in this way, and the output voltage is to be set 3VDD when the booster circuit 1 changes from the first condition to the second condition.

As shown in FIG. 5, during a period t3 to t4, the clock signal CLK output from the oscillator 10 is HIGH, and the booster circuit 1 changes from the first condition to the second condition. At this time, as shown in FIG. 7, the power supply E1, the input terminal Pin, the capacitor C2, and the output terminal Pout are connected in series in this order.

When the booster circuit 1 changes from the first condition to the second condition, a potential level of the second end of the capacitor C2 rises from a ground potential GND to the power supply potential VDD. At this time, a potential of the first end of the capacitor C2 raises from a potential level 2VDD to a potential level 3VDD. And the output voltage is set to 3VDD which is three times higher than the magnitude of the input voltage.

In the first condition, a potential level of the first end of the capacitor C2 is set to a potential level 2VDD. Then, in the second condition, a potential level of the second end of the capacitor C2 is set to a potential level VDD. In this way, it is possible to gain output voltage three times higher than the input voltage without increasing a number of capacitor. As described above, a number of capacitors included in the second booster path is less than a number of capacitors included in the first booster path.

An operation of the booster circuit 1 during a period t4 to t5 is the same with that of t2 to t3. Therefore, overlapping explanation is omitted.

The booster circuit 1 can be used in a various applications. Especially when it is used in a driver circuit for a liquid crystal display, a property of high withstand voltage is required for the booster circuit 1, because a drive voltage applied to a liquid crystal cell is high. Therefore, it is required to configure at least switch SW6 and SW1 which are included in the booster circuit 1 using elements having a high withstand voltage. Note that the elements having a high withstand voltage has a higher withstand voltage compared with the elements having a low withstand voltage.

Generally, an element having high withstand voltage requires a larger circuit space than that required for an element having low withstand voltage. In addition to this, on-resistance of the element having a high withstand voltage is higher than that of the element having a low withstand voltage. Therefore, it is required to increase amplitude of a voltage of a control signal, thereby causing an increase in power consumption. Note that the control signal is to be transmitted from the control circuit 2 to the switch element of the booster circuit 1.

If a booster circuit is configured with such a simple circuit configuration of this embodiment, it is possible to suppress an increase in the number of element having a high withstand voltage. Moreover, it makes it possible to lower amplitude of the voltage of the control signal.

Note that in this embodiment, the switch SW11 at a side of the output terminal included in the first booster path is configured with an element having a higher withstand voltage compared with the switch SW7 at a side of the input terminal included in the second booster path. And the switch SW6 at a side of the output terminal included in the second booster path is configured with an element having a higher withstand voltage compared with the switch SW5 at a side of the input terminal included in the second booster path.

The capacitors C1 to C3 are external capacitor parts. Especially when the booster circuit 1 is integrated in an IC, an increase in a number of the external capacitor parts results in a cost up of a circuit product. According to this embodiment, it is possible to reduce a number of the capacitor for boosting the input voltage and suppress the cost up of the booster circuit 1 effectively. And also, this makes it possible to suppress an increase in a circuit area and set the output voltage of the booster circuit 1 constant.

Second Embodiment

Figure 8:
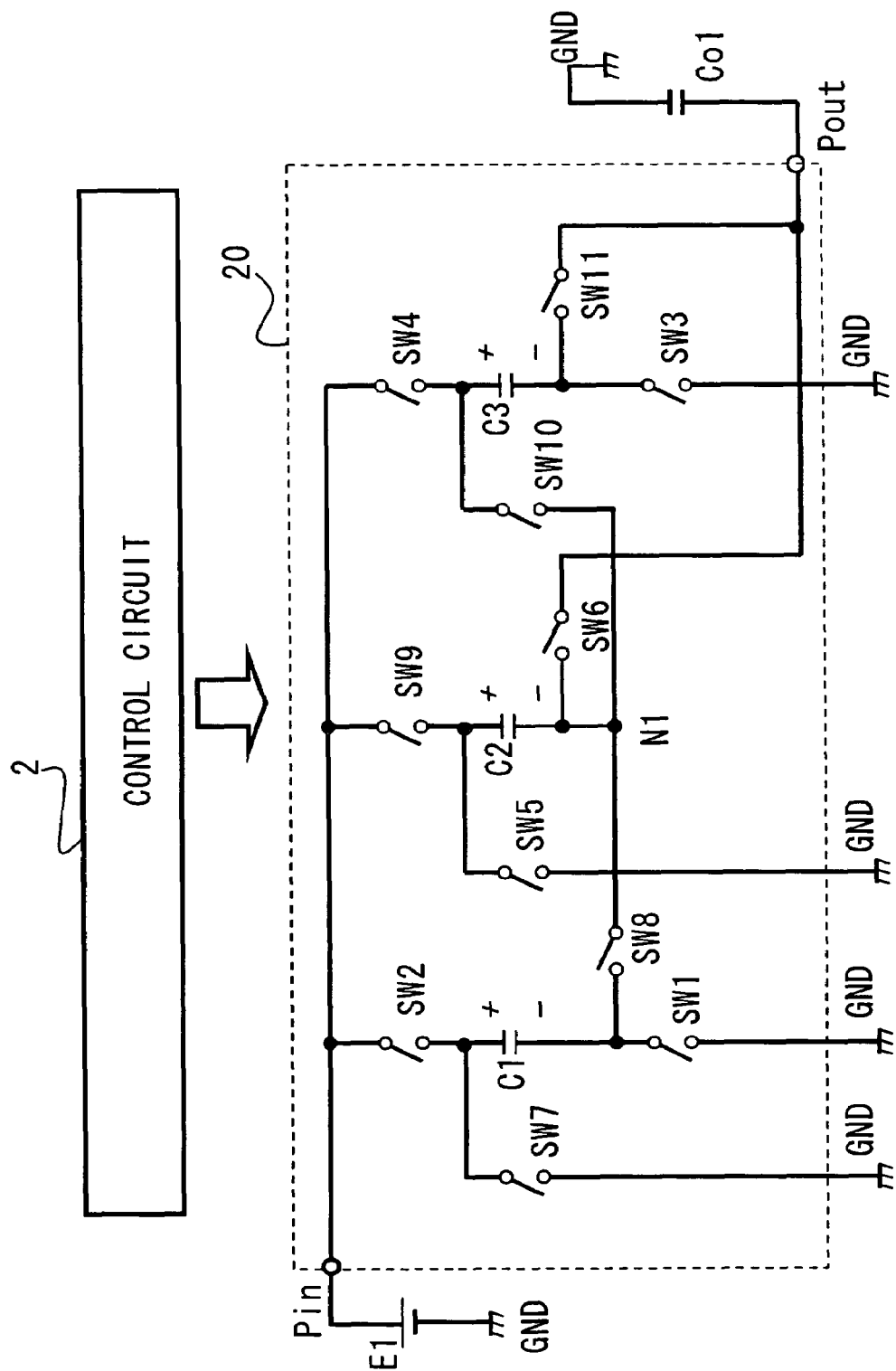
FIG. 8 is a schematic circuit diagram of a booster circuit according to a second embodiment of the present invention.
Figure 9:
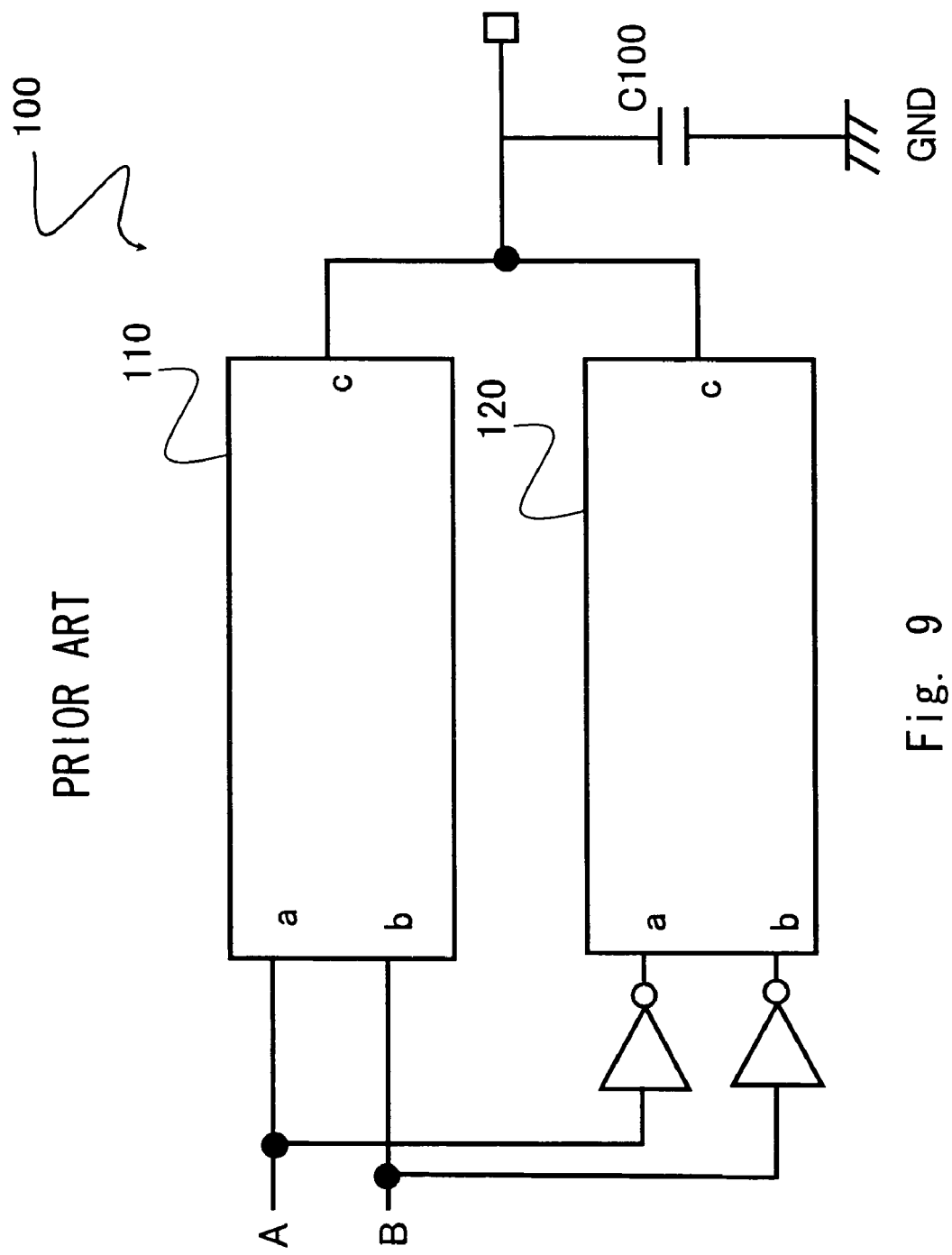
FIG. 9 is a schematic view of a related booster circuit.

A booster circuit 20 according to a second embodiment is shown in FIG. 8. The booster circuit 20 is an example of applying this invention to a booster circuit for a negative power supply. The booster circuit 20 outputs an output voltage −2VDD by doubling an input voltage VDD to a negative side. Charging the capacitors C1 and C3 are conducted at a ground potential GND with the power supply E1 as a standard. Charging the capacitor C2 is conducted with a bias between GND-VC1 (VC1 is a potential at one terminal of the capacitor C1). Configuration and operation of the booster circuit 20 are the same with the booster circuit 1 of the first embodiment. Note that in this second embodiment, the ground potential GND is the first power supply potential and the power supply potential VDD is the second power supply potential.

This invention is not limited to the above mentioned embodiments. That is, it is not limited to a circuit configuration for the three times boosting. It is possible to booster more than three times by increasing a number of the capacitor. It is noted that other circuit configuration can be adopted.

The switch unit can be configured with a one field effect transistor or a transfer switch.

It is apparent that the present invention is not limited to the above embodiment but may be modified and changed without departing from the scope and spirit of the invention.

What is claimed is:

1. A charge pump type booster circuit generating a positive or negative boosted output voltage by switching booster paths one by one, the charge pump type booster circuit comprising:
a plurality of booster paths, each of the plurality of booster paths including at least one booster capacitor,
wherein a number of the booster capacitor at each of the plurality of booster paths is different between one booster path and another booster path,
wherein the plurality of booster paths includes:
a first booster path outputting a first output voltage obtained by boosting an input voltage, the first booster path including at least a first booster capacitor and a third booster capacitor; and
a second booster path outputting a second output voltage obtained by boosting the input voltage, the second booster path including at least a second booster capacitor, wherein the first booster path further comprises a first switch group including:
a first switch unit between a first power supply potential and the first booster capacitor;
a second switch unit between the first booster capacitor and the third booster capacitor; and
a third switch unit between the third booster capacitor and an output terminal.

2. The booster circuit according to claim 1, wherein the booster circuit alternately outputs the first output voltage and the second output voltage.

3. The booster circuit according to claim 1, wherein the second booster capacitor is charged based on an output from the first booster capacitor.

4. The booster circuit according to claim 1, wherein a voltage boosted by the second booster capacitor is output as the second output voltage.

5. The booster circuit according to claim 1, wherein a number of capacitor included in the second booster path is less than a number of capacitor included in the first booster path.

6. The booster circuit according to claim 1, wherein the second booster path further includes a second switch group including:
a fourth switch unit between the first power supply potential and the second booster capacitor; and
a fifth switch unit between the second booster capacitor and the output terminal.

7. The booster circuit according to claim 6, wherein each of first terminals of the first and third booster capacitors is connected to the first power supply potential and each of second terminals of the first and third booster capacitors is connected to a second power supply potential when the second output voltage is output from the second booster path.

8. The booster circuit according to claim 6, wherein a second terminal of the second booster capacitor is connected to a second power supply potential when the first output voltage is output from the first booster path.

9. The booster circuit according to claim 7, wherein the first switch group further includes a second and sixth switch units between the first and third booster capacitors, the second switch unit is at a side of the first booster capacitor and the sixth switch unit is at a side of the third booster capacitor.

10. The booster circuit according to claim 9, wherein a first terminal of the second booster capacitor is connected to a node between the second switch unit and the sixth switch unit.

11. The booster circuit according to claim 9, wherein the second and sixth switch units are in an OFF-state when the second output voltage is output from the second booster path.

12. The booster circuit according to claim 1, wherein a level of the first output voltage is substantially the same with a level of the second output voltage.

13. The booster circuit according to claim 1, wherein each of the first and second output voltages is gained by boosting the input voltage three or more times.

14. The booster circuit according to claim 1, wherein each of the first and second output voltages is gained by boosting the input voltage by a negative multiple having an absolute value of two or more.

15. The booster circuit according to claim 1, further comprising:
an output terminal that is common among the plurality of booster paths; and
a smoothing capacitor connected to the output terminal and charged based on the positive or negative boosted output voltage.

16. A booster circuit comprising:

a first output path boosting an input voltage N (N is a positive or negative integer having an absolute value of two or more) times, coupled between an input terminal and an output terminal; and a second output path boosting the input voltage N times, coupled between the input terminal and the output terminal, wherein the booster circuit outputs a first boosted voltage output from the first output path and a second boosted voltage output from the second output path alternately to the output terminal, based on a control signal transmitted from a control circuit, and wherein the second boosted voltage is set based on a boosted voltage gained by boosting the input voltage M (M is a positive or negative integer having an absolute value smaller than that of N) times when the first output voltage is output from the booster circuit.

17. A booster circuit comprising:

a first capacitor;

a second capacitor;

a third capacitor;

a first booster circuit, which has a first voltage boost path including the first capacitor and the third capacitor, to output a first boosted voltage, by boosting a first voltage potential charged by the first capacitor with an input voltage, and by boosting a second voltage potential charged by the third capacitor with a boosted first voltage potential, the first booster circuit charging the first boosted voltage potential to the second capacitor; and a second booster circuit, which has a second voltage boost path including the second capacitor to output a second boosted voltage, by boosting the first voltage potential charged by the second capacitor with the input voltage, the second booster circuit charging the input voltage to the first and third capacitors.

18. The booster circuit as claimed in claim 17, wherein the first capacitor and the third capacitor are connected in series between an input terminal and an output terminal to output the first boosted voltage at the output terminal, and wherein the second capacitor is connected between the input terminal and the output terminal to output the second boosted voltage at the output terminal.

19. The booster circuit as claimed in claim 18, wherein the first booster circuit boosts the first voltage potential and the second voltage potential and charges the first voltage potential at a same time, and wherein the second booster circuit boosts the first voltage potential and the second voltage potential, and charges the input voltage at a same time.

20. A boost circuit, comprising:

a first capacitor;

a second capacitor;

a third capacitor;

a first switch coupled between an input terminal and the first capacitor;

a second switch coupled between the first capacitor and a predetermined power source;

a third switch coupled between the input terminal and the third capacitor;

a fourth switch coupled between the third capacitor and the predetermined power source;

a fifth switch coupled between the input terminal and the second capacitor;

a sixth switch coupled between the second capacitor and an output terminal;

a seventh switch coupled between the input terminal and the first capacitor;

an eighth switch coupled between the first and second capacitors;

a ninth switch coupled between the second capacitor and the predetermined power source;

a tenth switch coupled between the second and third capacitors; and an eleventh switch coupled between the third capacitor and the output terminal.

* * * * *